United States Patent [19]
Center et al.

[11] Patent Number: 5,953,007
[45] Date of Patent: Sep. 14, 1999

[54] SYSTEM, METHOD, AND PROGRAM FOR USING ANIMATIONS TO SHOW PAGE LAYOUT COMBINATIONS IN A USER INTERFACE FOR SUBMITTING PRINT JOBS

[75] Inventors: Kate Goes In Center, Loveland; Deborah Elisabeth Neuhard, Longmont; Robert Curt Nielsen, Longmont; Dwight Ross Palmer, Longmont, all of Colo.

[73] Assignee: International Business Machines Corporation, Armonk, N.Y.

[21] Appl. No.: 08/929,637

[22] Filed: Sep. 15, 1997

[51] Int. Cl.$^6$ ........................................... G06F 3/00
[52] U.S. Cl. ................................. 345/339; 345/350
[58] Field of Search ..................... 345/326–358

[56] References Cited

U.S. PATENT DOCUMENTS

| | | | |
|---|---|---|---|
| 4,520,454 | 5/1985 | Dufour et al. | 366/79 |
| 5,463,725 | 10/1995 | Henckel et al. | 345/350 |
| 5,634,021 | 5/1997 | Rosenberg et al. | 345/353 |

OTHER PUBLICATIONS

"Word 6.0—In a Word:Wow," James E. Powell, Windows Magazine, 1993, n 411, 95.

"Power Priority at a Bargain Price," Dave Methvin, Windows Magazine, 1992, n 303, 144.

"ODT 2.0 Launch Set . . . ," Dan Richman, Open Systems Today, 1992, No. 97, 1.

*Primary Examiner*—A. Katbab
*Attorney, Agent, or Firm*—Romualdas Strimaitis; Monica D. Lee

[57] ABSTRACT

The system, method, and program of this invention allows a user to specify one of a plurality of print layout combinations. Upon specifying a specific combination, an animation, embedded in the graphical user interface and within the dialog for making the selection, shows the page layout and rotates the sheet, about the applicable axis of the sheet, from front to back to show how the selected page layout would appear. Numbers on the animated sheet are used to show the layout of sequential pages. Numbers are used instead of displaying specific page content. The animation gives a clear practical way of visually conveying to a user how a specified page layout combination would appear when printed.

23 Claims, 13 Drawing Sheets

| 1-UP | SIMPLEX (35) | DUPLEX (36) | TUMBLE (37) |
|---|---|---|---|
| 31 — SIDE BY SIDE | X 301 | X 302 | X 303 |
| 32 — SLIT AND MERGE | X 304 | X 305 | X 306 |
| 33 — BOOKLET | X 307 | X 308 | X 309 |
| 34 — SIMPLE | ✓ 310 | ✓ 311 | ✓ 312 |

FIG. 3A

| 2-UP | SIMPLEX (35) | DUPLEX (36) | TUMBLE (37) |
|---|---|---|---|
| 31 — SIDE BY SIDE | ✓ 313 | ✓ 314 | ✓ 315 |
| 32 — SLIT AND MERGE | ✓ 316 | ✓ 317 | ✓ 318 |
| 33 — BOOKLET | X 319 | ✓ 320 | X 321 |
| 34 — SIMPLE | ✓ 322 | ✓ 323 | ✓ 324 |

FIG. 3B

| 3-UP | SIMPLEX | DUPLEX | TUMBLE |
|---|---|---|---|
| SIDE BY SIDE | ✓ 325 | ✓ 326 | ✓ 327 |
| SLIT AND MERGE | X 328 | X 329 | X 330 |
| BOOKLET | X 331 | X 332 | X 333 |
| SIMPLE | ✓ 334 | ✓ 335 | ✓ 336 |

FIG. 3C

| 4-UP | SIMPLEX | DUPLEX | TUMBLE |
|---|---|---|---|
| SIDE BY SIDE | ✓ 337 | ✓ 338 | ✓ 339 |
| SLIT AND MERGE | X 340 | X 341 | X 342 |
| BOOKLET | X 343 | X 344 | X 345 |
| SIMPLE | ✓ 346 | ✓ 347 | ✓ 348 |

FIG. 3D

SYSTEM, METHOD, AND PROGRAM FOR USING ANIMATIONS TO SHOW PAGE LAYOUT COMBINATIONS IN A USER INTERFACE FOR SUBMITTING PRINT JOBS

CROSS-REFERENCE TO RELATED APPLICATION

This application is related by common inventorship and subject matter to copending patent application Ser. No. 08/929,609 entitled "Method For Creating and Organizing a Job Ticket in a Network Printing System" filed on even date herewith, assigned to the Assignee hereof and entirely incorporated herein by this reference.

A portion of the disclosure of this patent document contains material which is subject to copyright or trademark protection. The copyright/trademark owner has no objection to the facsimile reproduction by anyone of the patent document or the patent disclosure, as it appears in the Patent and Trademark Office patent file or records, but otherwise reserves all copyright and trademark rights whatsoever.

BACKGROUND OF THE INVENTION

1. Field of the Invention

This invention relates to making user interfaces more user friendly by providing visual indicators that clarify a user's selection; and more specifically to providing a graphical user interface for specifying (e.g., selecting) one of many print layout combinations.

2. Description of the Related Art

Typically, documents (including books, manuscripts, etc.) are printed out from files stored in a computer system. Such documents may be created using a word processing program, or pre-existing hard copy documents may be scanned and digitized and then stored in a computer system. Computerized documents contain logical pages, i.e., non-physical representations of actual physical pages. There can be several different options for a user to lay out the logical pages of a document (documents) for printing on physical sheets of paper. For example, there may be two pages side by side on the same sheet of paper. This is referred to as "2-Up". It should be noted that a sheet of paper may also have various dimensions. For example, a sheet having the dimensions of 17×11 inches can accommodate two 8½×11 pages having a "2-Up" layout. Other sized sheets may accommodate a "4-Up" layout where 4 logical pages are printed on the same side of a sheet of paper. Users can specify any number of page images as being "up", e.g., 1-Up, 2-Up, 3-Up or 4-Up, depending upon the size of the logical pages and the size of the physical sheet of paper.

In addition to specifying the number of pages up, e.g., a "2-Up" layout, a user could further specify the mode such as simplex, duplex, or tumble. This is also referred to as specifying "sides". Simplex mode prints all of the logical pages on one side of the physical sheet of paper. Duplex and tumble modes print on both sides of the physical sheet of paper. In duplex mode, for example, page 1 would be on one side of the physical sheet, while page 2 would be on the opposite side of the sheet directly opposite page 1. In addition, in duplex mode, the top of page 1 is the same edge of the physical sheet of paper as the top of page 2. Tumble mode is similar to duplex mode in the sense that the logical pages are printed on both sides of the physical sheet. However, in tumble mode, the top of logical page 1, when printed on the physical sheet of paper, has an edge of the physical sheet that is at the bottom of logical page 2 that is printed on the back side of page 1. In other words, simplex prints just on the one side of the physical sheet, duplex turns left to right to print on both sides, and tumble turns top to bottom to print on both sides of the physical sheet of paper.

For example, a user could specify whether page 1 and page 2 should be facing up next to each other as in a simplex printing mode, or whether page 1 and page 3 should be facing up next to each other as in a duplex printing mode having page 2 on the back of page 1 and page 4 on the back of page 3. If front and back sides were to be oriented in the same direction, duplex mode would be specified; if front and back sides were to have upside down orientations to each other, tumble mode would be specified.

In addition, a user can specify an output format. For example, one format may have side-by-side copies. That is, copies of page 1 would be printed side by side each other. If the number up is specified as 2, then two images of page 1 would be printed side by side each other. If the number up is specified as 3, then three images (or copies) of page 1 would be printed side by side each other. The sheet can then be slit so that there are multiple copies (equal to the number up) coming out of the printer per sheet at a time. This output mode is referred to as "Side by Side". Another format, referred to as "Slit and Merge", prints the pages next to each other in such a way so that the sheet (web) can be cut (slit) in half and the left side placed over the top of the right side. Another format has the first and last pages on the same sheet, and the second and second to the last pages duplexed on the back of the same sheet, etc. This allows one to staple the sheets together like a book or magazine. This is referred to as "Booklet" output format. Another option allows no adjustment at all, referred to as "Simple".

The above discussion attempted to describe some of the various combinations that are possible in laying out logical pages on a physical sheet of paper. For example, the combinations include the number up (e.g., 1-, 2-, 3-, or 4-Up), mode or sides ("Simplex", "Duplex", "Tumble") and output format ("Side by Side", "Slit and Merge", "Booklet", or "Simple"). Sometimes it becomes too difficult for a user to readily visualize how a specified combination would actually appear on a sheet of paper. The difficulty is made worse by the number of different combinations that are possible. In addition, certain words were used, such as "simplex", "duplex", and "tumble", etc., to describe a more lengthy visual description. However, these specific words are not necessarily used or understood by all users.

In creating a user interface for specifying page layout combinations, a problem arises if a term is used that is not immediately understood by a user, or if a user is required to learn what the term means. Even then, if all of the terms were understood, the number of various combinations makes it difficult to immediately visualize how a specified page layout combination would actually appear on the printed sheet. Thus, a problem arises when a user is required to specify a page layout combination. Many times it is not clear to the user how the various choices for a page layout will visually appear on the printed sheet.

One approach that enables a user to visually view the page layout involves "RIP'ing" (Raster Image Processing) the file, i.e., creating the bits of the contents of the document so that one can actually see each page and the associated page numbers, etc. This would create a preview or picture on the display screen of what the user intends to print. The output can then be verified by the user that the output layout is as the user wants. However, this approach may not be practical in some circumstances as it may consume significant processing time.

SUMMARY OF THE INVENTION

It is, therefore, an object of this invention to provide a user interface for specifying page layout combinations that enables a clear and practical visual understanding of a print layout specified by a user.

It is a further object of this invention to provide a visual user interface that shows, within the user interface, what the page layout combination would look like.

The system, method, and program of this invention allows a user to specify one of a plurality of print layout combinations. In the preferred embodiment, the various selections are combined into combo boxes in such a way as to diminish the ability of a user to make various combinations of print layout selections that do not have a practical meaning. That is, the choices are set up so that the user can usually select a combination that has practical meaning and can be printed according to the user's selection. Upon specifying a specific combination, an animation, embedded in the graphical user interface and within the dialog for making the selection, shows the page layout and rotates the sheet from front to back to show how the selected page layout would appear. Numbers, showing the layout of sequential pages on the sheet, are located on the animated sheet instead of specific page content.

In a preferred embodiment, the page layout combinations include: (a) the number of images on a sheet, i.e., the number up, e.g., 1-, 2-, 3-, or 4-Up; (b) the "Sides", i.e., either "Simplex", "Duplex", or "Tumble"; and (c) output format, i.e., "Side by Side", "Slit and Merge", "Booklet", or "Simple". More specifically, upon selecting a specific combination by a user, but before the selection is sent for processing, an animation shows the front and back side of the sheet. Initially, the animation shows the front of the sheet. A user interface button named "Show Back" will show the back of the sheet. When a user selects the button, the animation will play and will show the sheet turning from front to back. The animation shows the sheet rotating across the appropriate axis. For example, for duplex, the sheet would rotate, about a vertical axis, left to right to the back side and then rotate around again to the front side. If the user selected "tumble", the sheet would rotate, about a horizontal axis, top to bottom.

In addition, numbers are used to show the relationship of sequential pages on a sheet. The numbers are used instead of displaying specific page content. For example, if a user specified "2 up" and "side by side", there would be two 1's (i.e., 1 1) next to each other. A dotted line would separate the numbers indicating the different copies of that page on the one sheet. If duplex were also specified, after selecting the "show back" button, the animation would show the back of the sheet with two 2's next to each other—again, separated by a dotted line to show the different copies of page 2, i.e., the next sequential page after the page shown on the front side of the sheet. If simplex were specified, "show back" would not show anything, i.e., the animation would not rotate since there is no back. In another embodiment, the animation could rotate to reveal that the back is blank, i.e., without any numbers or dotted lines showing page boundaries. If "2-Up" and "Slit and Merge" and "Duplex" were specified, the animation would show numbers 1 and 3 on the front side and 2 and 4 on the back side, where 2 is on the back of 1 and 4 is on the back of 3.

The animation gives a clear practical way of visually conveying to a user how a specified page layout combination would appear when printed. Since it is not necessary to display the actual page contents in order to understand the appearance of the page layout combination, the animation used herein eliminates undue processing that is associated with "RIP'ing" a file. However, if RIPing the file (or otherwise showing the actual page contents) does not require undue processing, it may be more preferable to animate the actual data instead of using numbers, e.g., "1", "2", etc., for the page content.

BRIEF DESCRIPTION OF THE DRAWING

For a more complete understanding of this invention, reference is now made to the following detailed description of the embodiments as illustrated in the accompanying drawing, wherein:

FIGS. 3A, 3B, 3C, and 3D show the combinations of print layout choices that are supported in the preferred embodiment of the invention;

DETAILED DESCRIPTION OF THE PREFERRED EMBODIMENTS

A preferred embodiment of the invention is used in a print submit program that uses job tickets as described in copending application Ser. No. 08/929,609 filed on even date herewith and incorporated herein by reference. The job ticket has a certain structure with attributes. A job ticket allows a user to specify various combinations of files for printing and to specify other parameters for printing those files such as printer, type of paper to be used, page layout combinations, etc.

Figure 1:
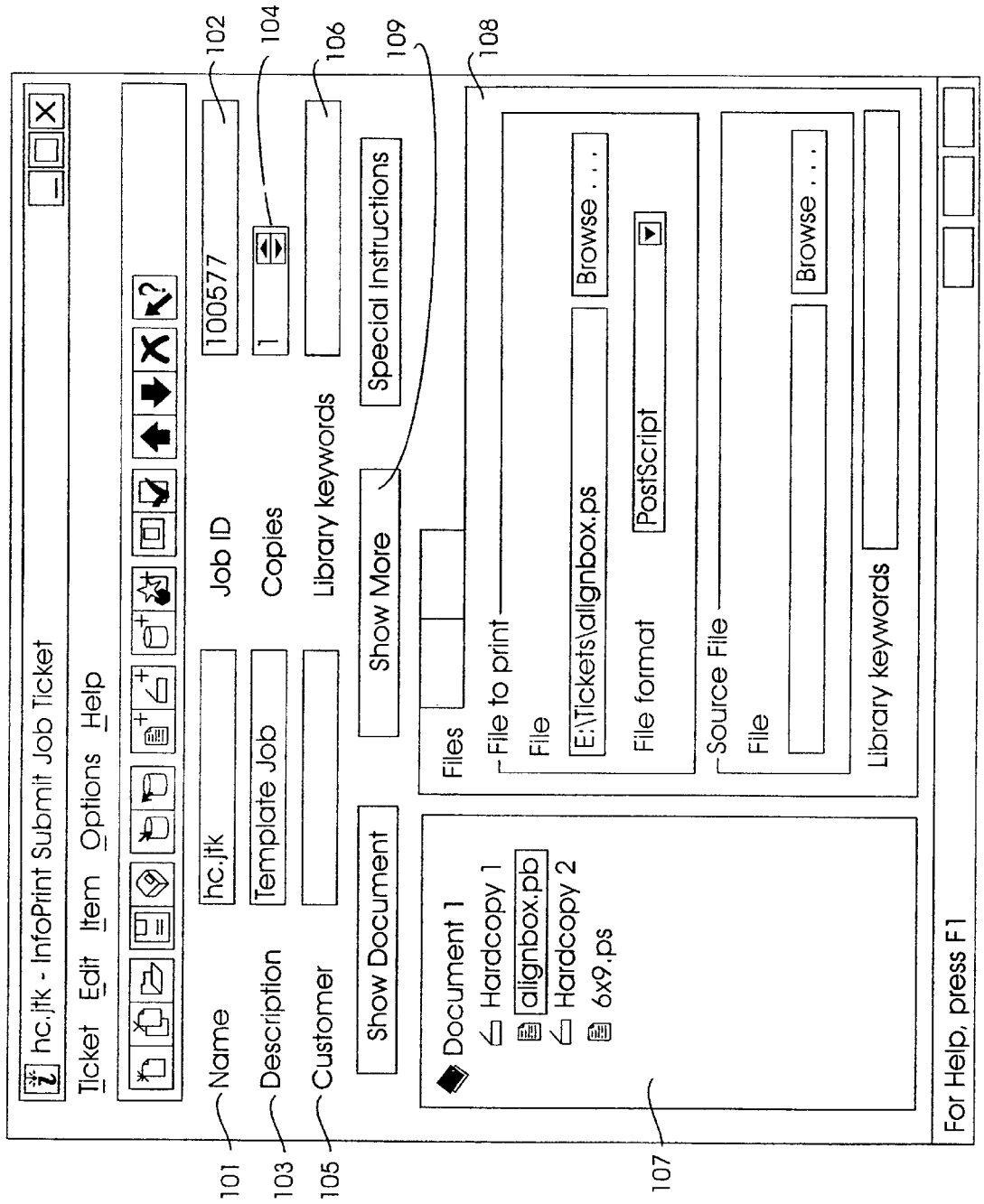
FIG. 1 illustrates a user interface for using a job ticket in a print submit program that allows a user to specify print attributes of a print job.
Figure 2:
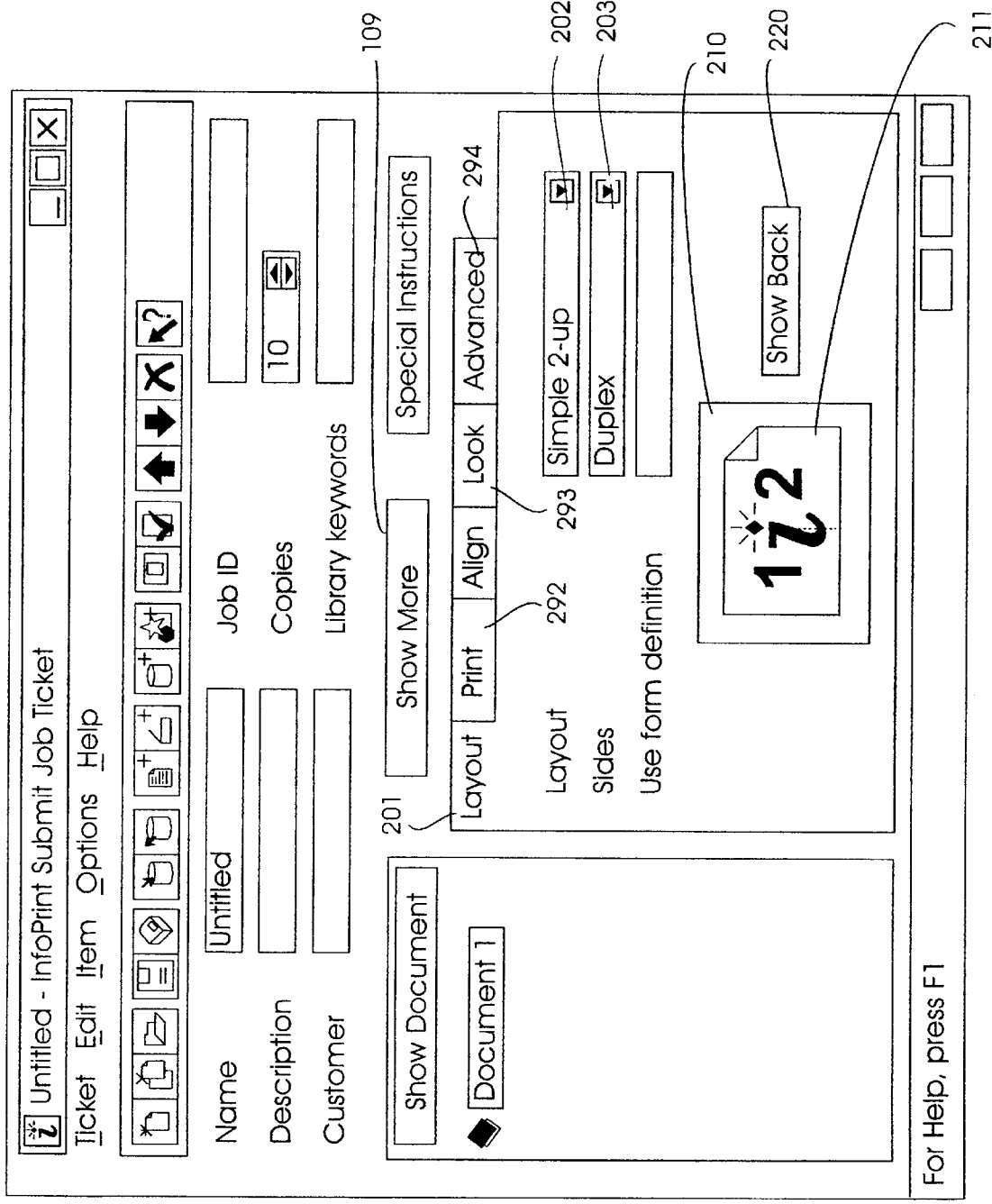
FIG. 2 illustrates a layout folder in the job ticket interface of FIG. 1 that allows a user to specify a print layout.

FIG. 1 shows a job ticket. There are six fields at the top: ticket name 101; job ID 102; description 103; number of copies 104; customer name or identifier 105; and a library keyword 106. There is also a tree view of the job ticket contents 107, i.e., which files are associated with the job ticket and the order of the files. To the right of the tree view is a tab dialog 108 showing the attributes of the file selected (highlighted) in the tree view 107. The "Show More" button 109 displays to the user more folders, as shown in FIG. 2, including Layout 201, Print 292, Look 293, and Advanced 294. These other folders allow the user to specify other attributes of the print job. In creating a job ticket, as shown in FIG. 1, the user selects the attributes of the job ticket, including the page layout as shown in FIG. 2. A similar layout panel is available to a user when a user submits a scanned document for printing. A different application program controls the scanned submission than the application that is used to create and submit job tickets. However, both applications provide a similar graphical user interface that uses animations to visually illustrate a user specified page layout to the user.

More specifically, with reference to FIG. 2, the Layout folder 201 enables a user to specify the page layout combination. Layout 202 is a combo box that allows a user to select (specify) the output format, i.e., "Side by Side", "Slit and Merge", "Booklet", or "Simple" and the number of images on a sheet, i.e., the number up, e.g., 1-, 2-, 3-, or 4-Up. The output format and number up has been combined into one combo box, Layout 202, so that only the choices that "make sense" are provided to the user. For example "Booklet 3 up" is not included since this combination does not make any practical sense. Therefore, the number of possible combinations are reduced by providing only the meaningful combinations.

"Sides" 203 is a combo box that allows a user to select (specify) the sides, i.e., either "Simplex", "Duplex", or "Tumble". Area 210 contains the animation of the sheet 211, and the "Show Back" button 220 will play the animation to show the back of the sheet when selected. The animation 210 appears in the same panel where the user specifies the page layout combinations.

As the values in the two combo boxes 202, 203 change, then the animation 210 changes. To avoid distracting the user, the animation does not play until the user selects the "Show Back" button 220. However, the front side does change as the user selects and deselects different "Layout" choices in combo box 202.

The pseudocode for animations for page layout is as follows:

```
// Interpret the values of Sides, Output Format, and Number Up
// to select the appropriate animation.
// Set up NULL animation in case a value is chosen that does not
// have an animation
aviID = NULL;
// Retrieve current GUI values for layout parameters
sidesVal.LoadValueFromGUI();
layoutVal.LoadValueFromGUI();
// Disable "Show Back" button if a simplex job is selected
// Enable "Show Back" button if duplex or tumble is selected
if (sidesVal == Simplex) ShowBackButton.Disable();
else ShowBackButton.Enable();
// Choose the animation based on page layout parameters
// In this embodiment, there is a subset of possible combinations
if (layoutVal == IPJ_1_UP_NO_ADJUSTMENT) {
    if (sidesVal == IPJ_SIMPLEX) aviID =
        IDR_SIMPLEX_1_UP_NO_ADJUSTMENT;
    else if (sidesVal == IPJ_DUPLEX) aviID =
        IDR_DUPLEX_1_UP_NO_ADJUSTMENT;
    else if (sidesVal == IPJ_TUMBLE) aviID =
        IDR_TUMBLE_1_UP_NO_ADJUSTMENT;
} else if (layoutVal == IPJ_2_UP_NO_ADJUSTMENT) {
    if (sidesVal == IPJ_SIMPLEX) aviID =
        IDR_SIMPLEX_2_UP_NO_ADJUSTMENT;
    else if (sidesVal == IPJ_DUPLEX) aviID =
        IDR_DUPLEX_2_UP_NO_ADJUSTMENT;
    else if (sidesVal == IPJ_TUMBLE) aviID =
        IDR_TUMBLE_2_UP_NO_ADJUSTMENT;
} else if (layoutVal == IPJ_2_UP_SIDE_BY_SIDE) {
    if (sidesVal == IPJ_SIMPLEX) aviID =
        IDR_SIMPLEX_2_UP_SIDE_BY_SIDE;
    else if (sidesVal == IPJ_DUPLEX) aviID =
        IDR_DUPLEX_2_UP_SIDE_BY_SIDE;
    else if (sidesVal == IPJ_TUMBLE) aviID =
        IDR_TUMBLE_2_UP_SIDE_BY_SIDE;
} else if (layoutVal == IPJ_2_UP_SLIT_AND_MERGE) {
    if (sidesVal == IPJ_SIMPLEX) aviID =
        IDR_SIMPLEX_2_UP_SLIT_AND_MERGE;
    else if (sidesVal == IPJ_DUPLEX) aviID =
        IDR_DUPLEX_2_UP_SLIT_AND_MERGE;
    else if (sidesVal == IPJ_TUMBLE) aviID =
        IDR_TUMBLE_2_UP_SLIT_AND_MERGE;
} else if (layoutVal == IPJ_2_UP_BOOKLET) {
    aviID = IDR_DUPLEX_2_UP_BOOKLET;
} else if (layoutVAL == IPJ_3_UP_NO_ADJUSTMENT) {
    if (sidesVal == IPJ_SIMPLEX) aviID =
        IDR_SIMPLEX_3_UP_NO_ADJUSTMENT;
    else if (sidesVal == IPJ_DUPLEX) aviID =
        IDR_DUPLEX_3_UP_NO_ADJUSTMENT;
    else if (sidesVal == IPJ_TUMBLE) aviID =
        IDR_TUMBLE_3_UP_NO_ADJUSTMENT;
} else if (layoutVal == IPJ_3_UP_SIDE_BY_SIDE) {
    if (sidesVal == IPJ_SIMPLEX) aviID =
        IDR_SIMPLEX_3_UP_SIDE_BY_SIDE;
    else if (sidesVal == IPJ_DUPLEX) aviID =
        IDR_DUPLEX_3_UP_SIDE_BY_SIDE;
    else if (sidesVal == IPJ_TUMBLE) aviID =
        IDR_TUMBLE_3_UP_SIDE_BY_SIDE;
} else if (layoutVAL == IPJ_4_UP_NO_ADJUSTMENT) {
    if (sidesVal == IPJ_SIMPLEX) aviID =
        IDR_SIMPLEX_4_UP_NO_ADJUSTMENT;
    else if (sidesVal == IPJ_DUPLEX) aviID =
        IDR_DUPLEX_4_UP_NO_ADJUSTMENT;
    else if (sidesVal == IPJ_TUMBLE) aviID =
        IDR_TUMBLE_4_UP_NO_ADJUSTMENT;
} else if (layoutVal == IPJ_4_UP_SIDE_BY_SIDE) {
    if (sidesVal == IPJ_SIMPLEX) aviID =
        IDR_SIMPLEX_4_UP_SIDE_BY_SIDE;
    else if (sidesVal == IPJ_DUPLEX) aviID =
        IDR_DUPLEX_4_UP_SIDE_BY_SIDE;
    else if (sidesVal == IPJ_TUMBLE) aviID =
        IDR_TUMBLE_4_UP_SIDE_BY_SIDE;
}
// load the animation; user must press Show Back or double click
// to play it.
If (aviID !=NULL) {
    m_AVI.Open(aviID);
} else {
    // no AVI, so clear the control
    m_AVI.Close();
    m_AVI.Invalidate();
}
```

FIGS. 3A, 3B, 3C, 3D illustrate the various page layout combinations for 1-Up, 2-Up, 3-Up, and 4-Up, respectively. The checkmarks indicate the combinations for which animation is provided in the preferred embodiment of this invention. The "X's" indicate the combinations that do not have a practical meaning in the preferred embodiment of this invention.

For example, as shown in FIG. 3A, Side by Side 31, Slit and Merge 32, and Booklet 33 are all formats that by their nature have more than one image (copy or page) on a sheet. These formats, therefore, do not have a practical meaning in relation to 1-Up as shown by the "X's" 301–309.

Also, with reference to FIG. 3B, booklet is defined to mean two pages front and back of a sheet in duplex mode where the front side of the sheet has the last page and the first page (i.e., 2-Up), and duplexed on the back side is the second to the last page and the second page, respectively, etc. By definition, within the preferred embodiment of this invention, booklet requires 2-Up and duplex as shown by the checkmark 320 in FIG. 3B and the X's 319, 321 (FIG. 3B); 331, 332, 333 (FIG. 3C); 343, 344, 345 (FIG. 3D); and 307, 308, 309 (FIG. 3A). However, other embodiments may define booklet differently or have another format where some or all of these combinations could have a practical meaning. For example, booklet may be defined such that for each opened page in the final book there is only printing on the right side of the opened page. This may require printing one image on each side of the sheet in a 2-Up fashion (i.e., two image areas) where one image area on each side is left blank, and where the back side of each blank area has a content image, i.e., number.

Likewise, with reference to FIGS. 3A–3D, Slit and Merge 32 is defined to mean two images next to each such that the left side would be placed over the right side when cut. By definition, within the preferred embodiment of this invention, Slit and Merge requires 2-Up. Thus, the checkmarks 316, 317, 318 for 2-Up as shown in FIG. 3B and the "X's" 304, 305, 306 (FIG. 3A) for 1-Up; 328, 329, 330 (FIG. 3C) for 3-Up; and 340, 341, 342 (FIG. 3D) for 4-Up. However, other embodiments may define Slit and Merge differently or have another format where some or all of these combinations could have a practical meaning. For example, Slit and Merge may be defined to allow for multiple cuts such that the left-hand side is placed on top of the middle part which is placed on top of the right-hand part, etc. This would allow for 3-Up in other embodiments, and likewise for 4-Up combinations.

Figure 4A:
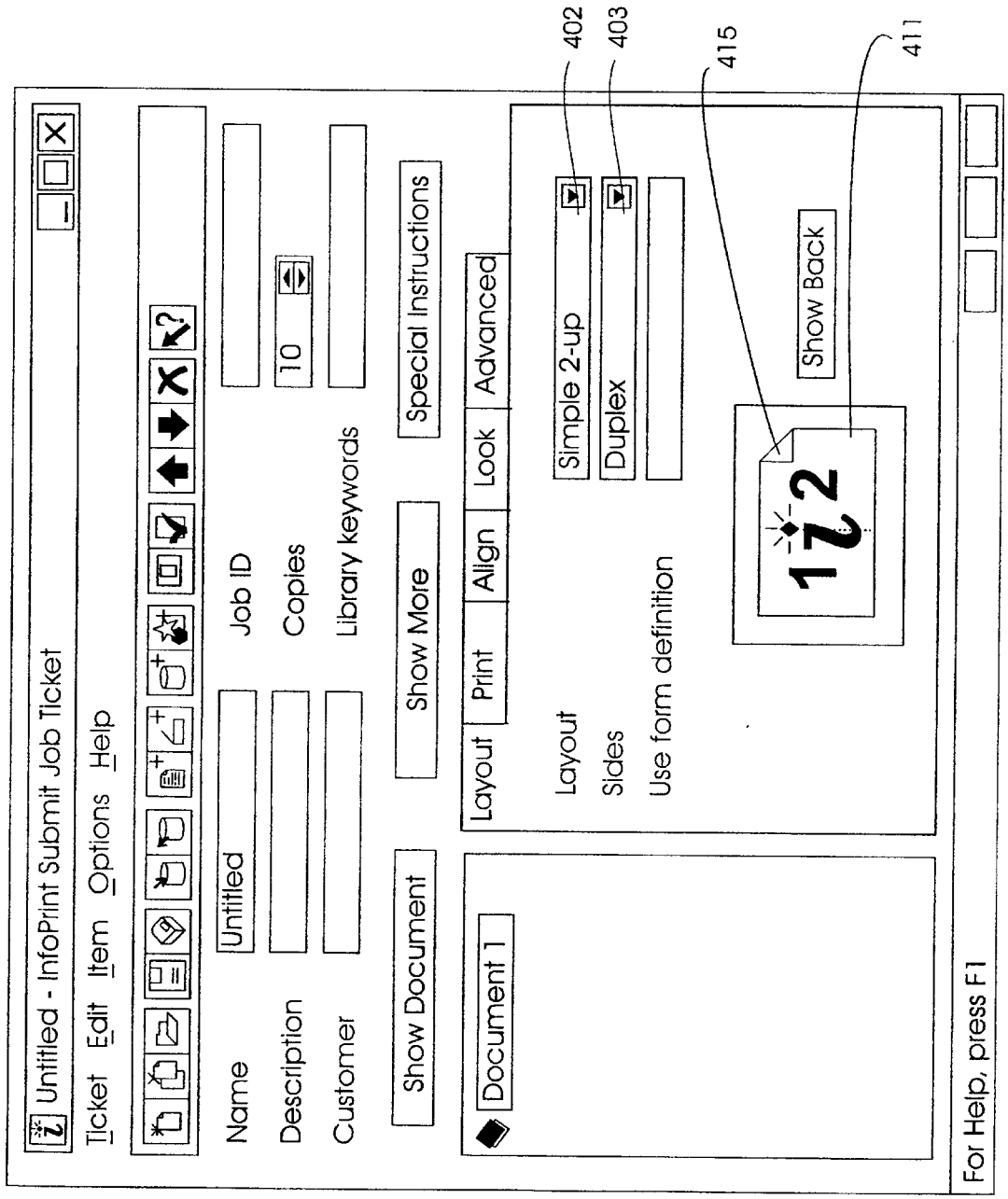
FIGS. 4A, 4B, and 4C illustrate the animation for a print layout having a Simple output format, 2-Up, and Duplex.
Figure 4B:
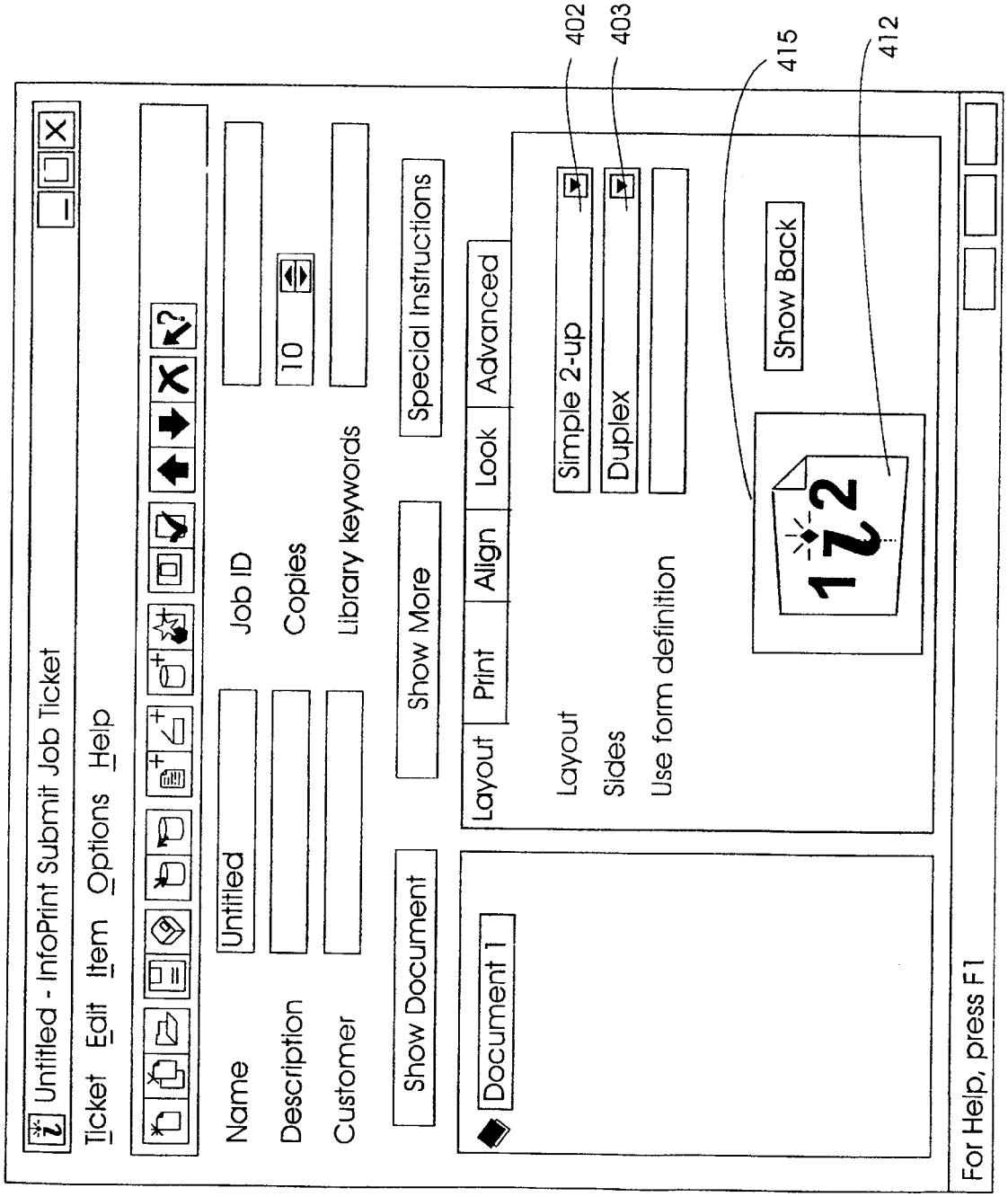
Figure 4C:
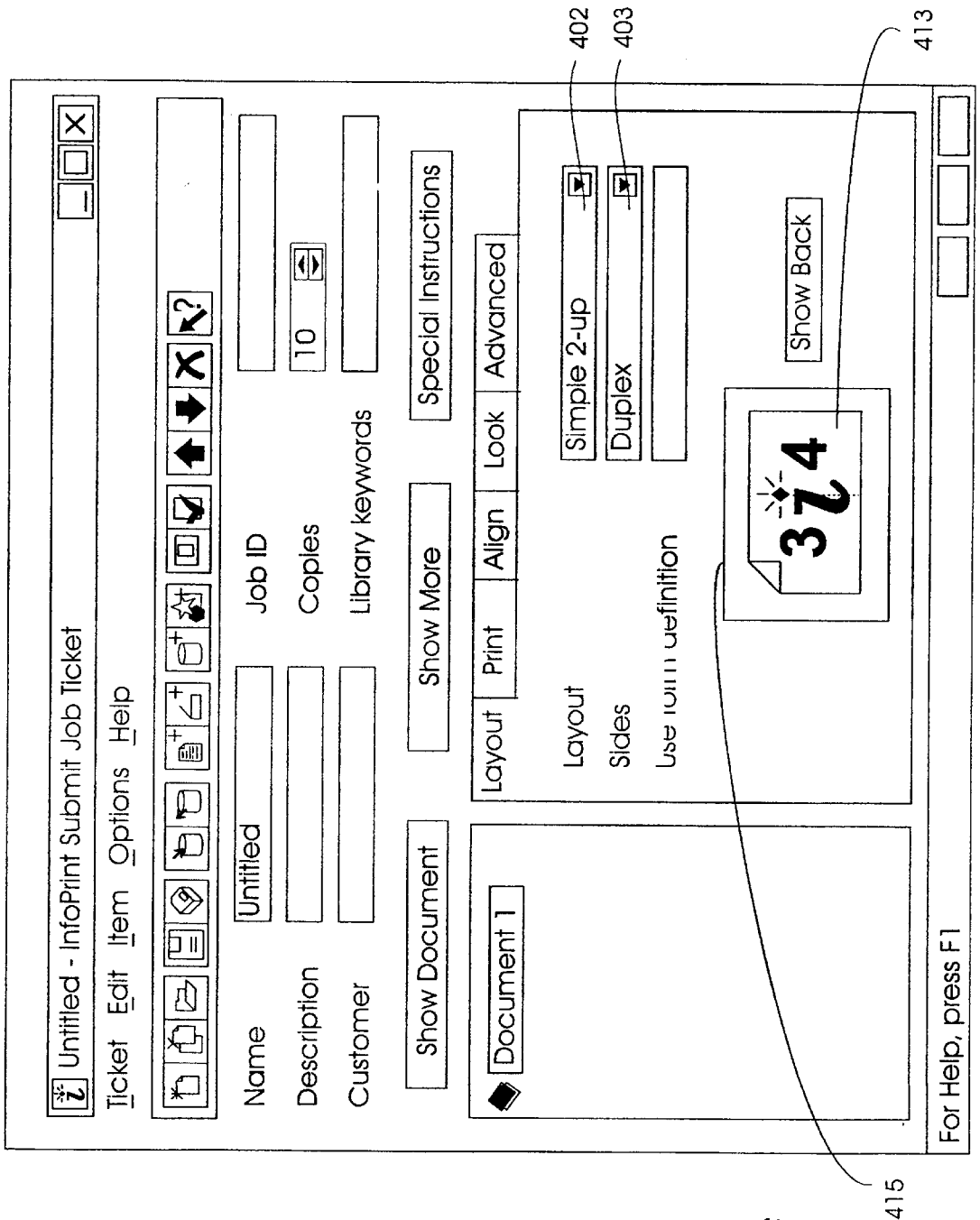

FIGS. 4A, 4B, 4C, 5A, 5B, 5C, 6A, 6B, and 6C show examples of the animation for various print layout combinations as illustrated in still-frame snapshots. FIGS. 4A, 4B, and 4C show the animation of a print layout having a Simple output format, 2-Up and Duplex, 402, 403. FIG. 4A shows the front side 411, FIG. 4B shows the sheet turning about the center vertical axis 412 towards the back side, and FIG. 4C shows the back side 413. The animation also shows that page 4 is on the back side of page 1 and page 3 is on the back side of page 2. The dog ear 415 indicates to a user a common point on the sheet that can be used as a reference point as the sheet changes orientation.

Figure 5A:
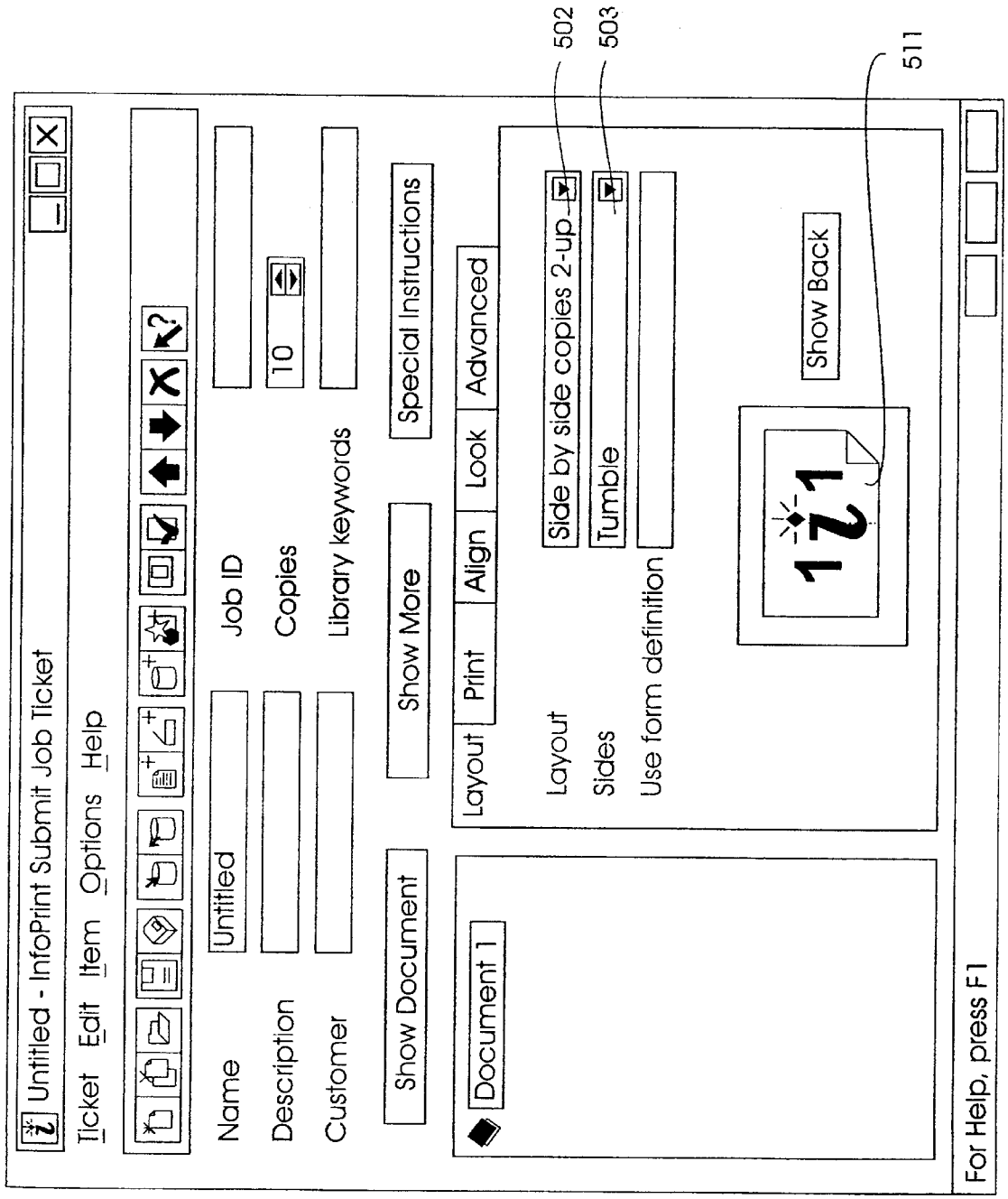
FIGS. 5A, 5B, and 5C illustrate the animation for a print layout having a Side by Side output format, 2-Up, and Tumble.
Figure 5B:
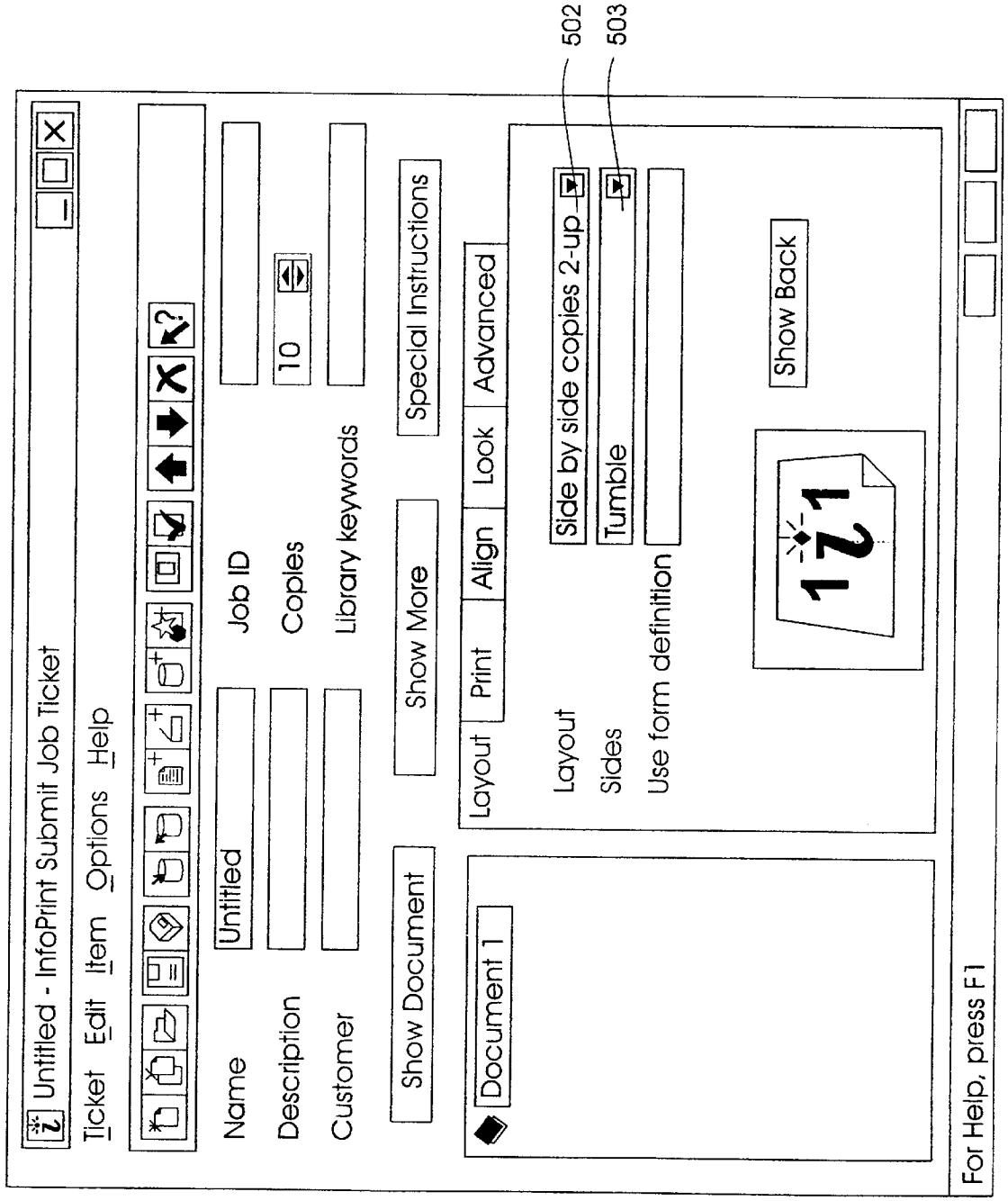
Figure 5C:
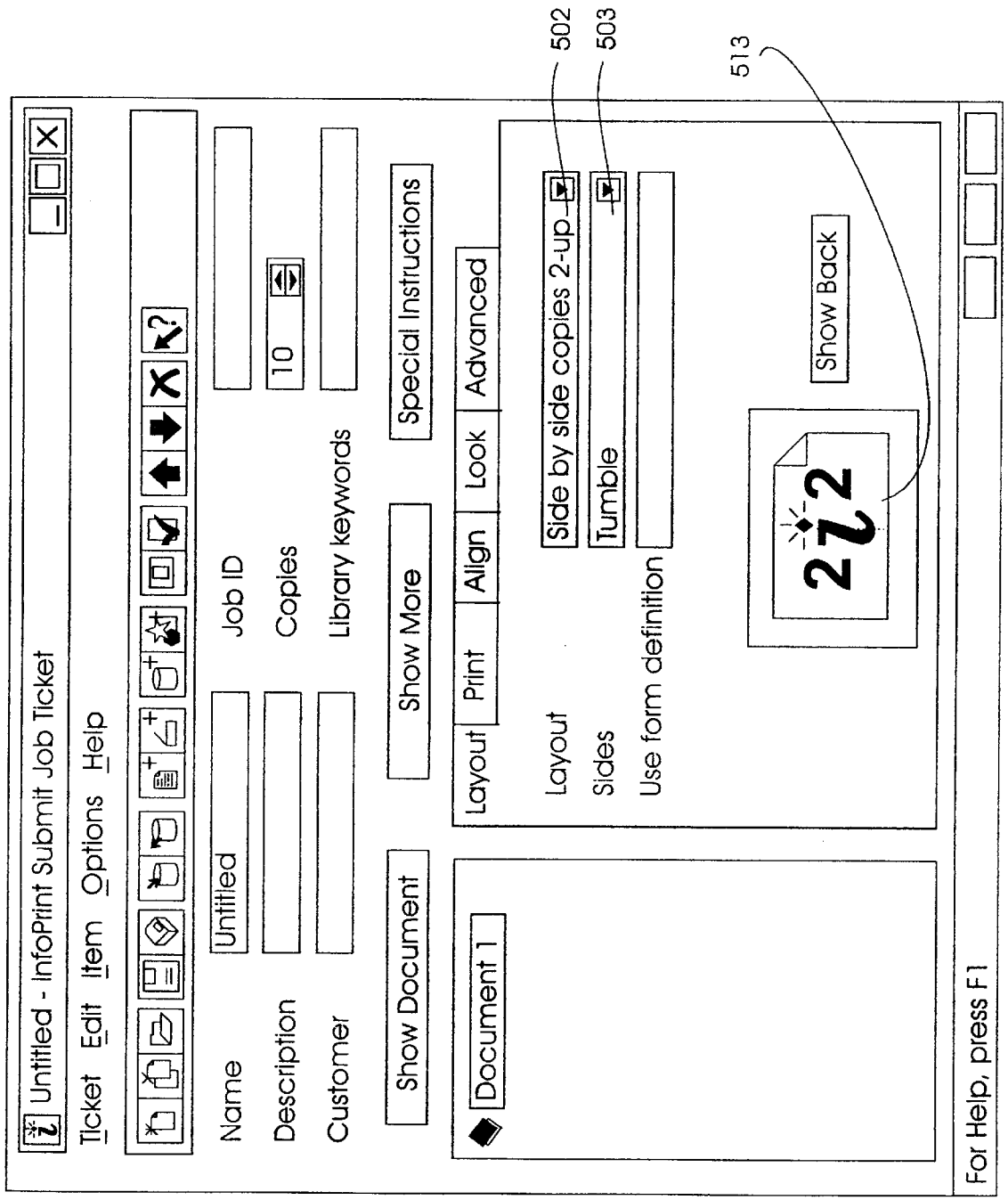

FIGS. 5A, 5B, and 5C show the animation of a print layout having Side by Side output format, 2-Up and Tumble, 502, 503. FIG. 5A shows the front side 511, FIG. 5B shows the sheet turning about the center horizontal axis toward the back side, and FIG. 5C shows the back side 513. The animation also shows two copies of page 1 side by side on the front side, and two copies of page 2 side by side on the back side where the contents (indicated by the page number 2) of page 2 would be upside down from the contents of page 1 due to the Tumble selection 503.

Figure 6A:
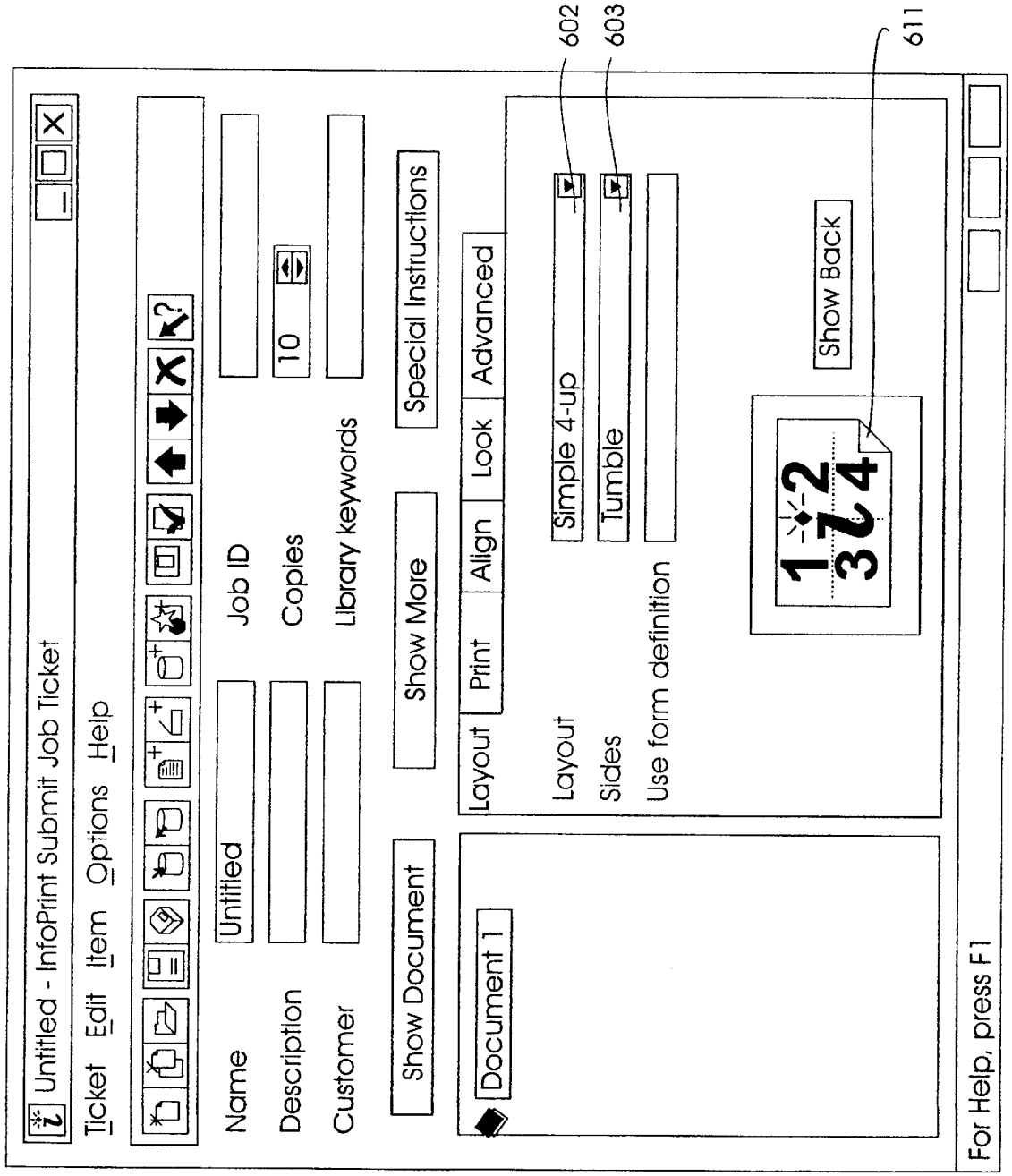
FIGS. 6A, 6B, and 6C illustrate the animation for a print layout having a Simple output format, 4-Up, and Tumble.
Figure 6B:
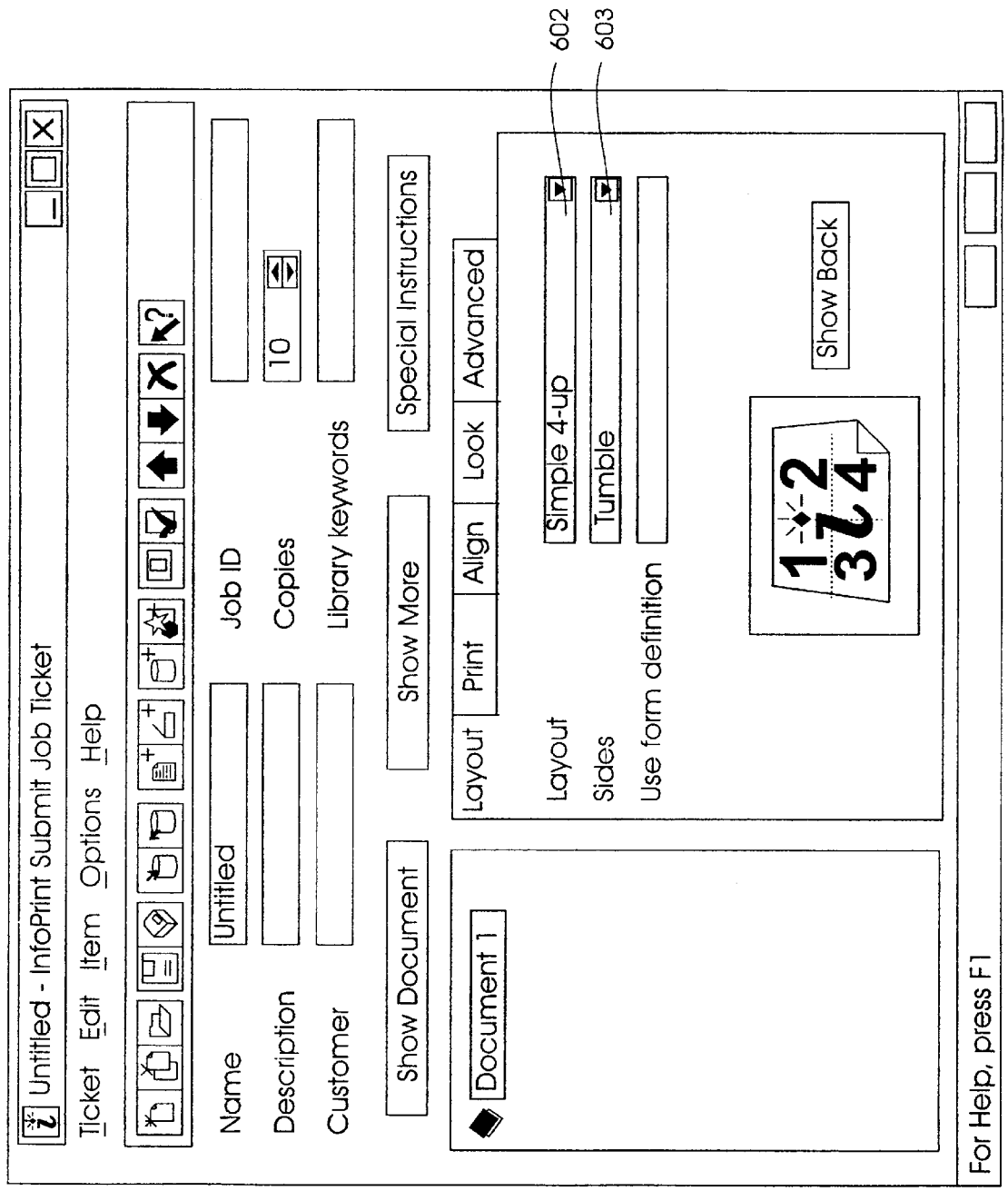
Figure 6C:
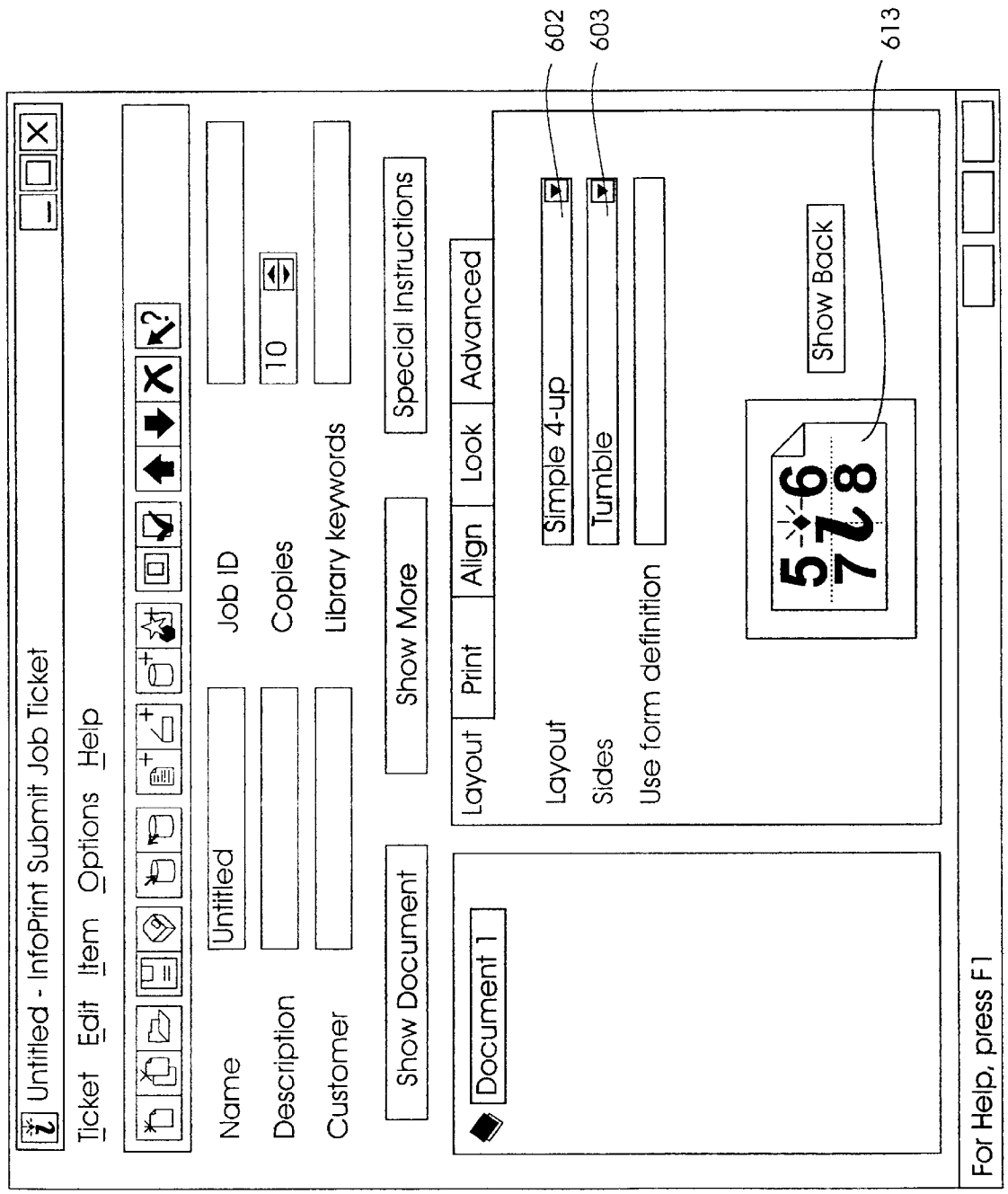

FIGS. 6A, 6B, and 6C show the animation of a print layout having a Simple output format, 4-Up and Tumble, 602, 603. FIG. 6A shows the front side 611, FIG. 6B shows the sheet turning about the center horizontal axis toward the back side, and FIG. 6C shows the back side 613. The animation also shows that page 7 is on the back side of page 1, page 8 is on the back side of page 2, page 5 is on the back side of page 3, and page 6 is on the back side of page 4.

It should be noted that although the preferred embodiment of this invention shows a fanciful "i" on the sheet in the animation area, this is merely an arbitrary mark indicating IBM's Info Print Submit application program of the preferred embodiment of the invention that is to be marketed, e.g., licensed and distributed; and this fanciful "i" is not a part of the invention as claimed herein.

The above has described a preferred embodiment of the invention in relation to an application that handles files of a certain type, such as job tickets for print job submissions. However, the system, method, and program of this invention are applicable to any type of program that enables a user to print files, including but not limited to, documents, etc.

Using the foregoing specification, the invention may be implemented as a machine, process, or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

One skilled in the art of computer science will easily be able to combine the software created as described with appropriate general purpose or special purpose computer hardware to create a printer system and/or computer system and/or printer or computer subcomponents embodying the invention and to create a computer/printer system and/or computer/printer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, some modifications and adaptations may include the following:

user input may be received from the keyboard, mouse, pen, voice, touch screen, or any other means by which a human can input data to a computer, including through other programs such as application programs; and other print layout combinations could be used along with other animations to visually show a selected layout combination.

We claim:

1. A computer system comprising:
   means for displaying a user interface enabling a user to specify a print layout;
   means for visually representing the specified print layout on a front side and a back side of a sheet; and
   means for displaying, in the user interface, an animation of the sheet rotating from the front side to the back side of the sheet to show the visual representation of the specified print layout on both sides of the sheet.

2. The computer system of claim 1 wherein the print layout has a plurality of characteristics being specified.

3. The computer system of claim 2 wherein the user interface enables a user to specify the plurality of characteristics in a way as to diminish a possibility of selecting a combination of characteristics having an unpractical meaning.

4. The computer system of claim 3 wherein predetermined combinations of selections from the characteristics of output format and number-up are displayed for selection by the user.

5. The computer system of claim 1 wherein the visual representation further comprises numbers representing sequential pages wherein the numbers are displayed instead of a specific page content.

6. The computer system of claim 1 wherein the print layout of the sheet has at least one image of a page.

7. The computer system of claim 1 wherein the print layout of the sheet has a plurality of pages.

8. The computer system of claim 1 wherein the sheet rotates about a vertical axis if a top of each image of each page on both sides of the sheet share a same edge of the sheet.

9. The computer system of claim 1 wherein the sheet rotates about a horizontal axis if a top of a front page image on the front side of the sheet and the top of a back page image on the back side of the sheet have opposite edges of the sheet.

10. A computer system comprising:
   means for displaying a user interface enabling a user to specify a print layout;
   means for visually representing the specified print layout on a front side of a sheet upon the user specifying the print layout;
   means for displaying a selectable button; and
   means for displaying, upon a user selecting the button, an animation of the sheet rotating from the front side to the back side of the sheet to show the visual representation of the specified print layout on a back side of the sheet and a relation of the print layout on the front side to the print layout on the back side.

11. The computer system of claim 10 wherein a corner of the sheet is visually shown as being folded over to indicate the relation of the front side to the back side as the sheet rotates.

12. A computer program having computer-readable program code means on a computer-usable medium, the computer program comprising:
   means for causing a display of a user interface enabling a user to specify a print layout;
   means for causing a visual representation of the specified print layout on a front side and a back side of a sheet; and
   means for causing a display, in the user interface, of an animation of the sheet rotating from the front side to the back side of the sheet to show the visual representation of the specified print layout on both sides of the sheet.

13. The computer program of claim 12 wherein the print layout has a plurality of characteristics being specified.

14. The computer program of claim 13 wherein the user interface enables a user to specify the plurality of characteristics in a way as to diminish a possibility of selecting a combination of characteristics having an unpractical meaning.

15. The computer program of claim 14 wherein predetermined combinations of selections from the characteristics of output format and number-up are displayed for selection by the user.

16. The computer program of claim 12 wherein the visual representation further comprises numbers representing sequential pages wherein the numbers are displayed instead of a specific page content.

17. The computer program of claim 12 wherein the print layout of the sheet has at least one image of a page.

18. The computer program of claim 12 wherein the print layout of the sheet has a plurality of pages.

19. The computer program of claim 12 wherein the sheet rotates about a vertical axis if a top of each image of each page on both sides of the sheet share a same edge of the sheet.

20. The computer program of claim 12 wherein the sheet rotates about a horizontal axis if a top of a front page image on the front side of the sheet and the top of a back page image on the back side of the sheet have opposite edges of the sheet.

21. A computer program having computer-readable program code means on a computer-usable medium, the computer program comprising:
   means for causing a display of a user interface enabling a user to specify a print layout;
   means for causing a visual representation of the specified print layout on a front side of a sheet upon the user specifying the print layout;
   means for causing a display of a selectable button; and
   means for causing a display, upon a user selecting the button, of an animation of the sheet rotating from the front side to the back side of the sheet to show the visual representation of the specified print layout on a back side of the sheet and a relation of the print layout on the front side to the print layout on the back side.

22. The computer program of claim 21 wherein a corner of the sheet is visually shown as being folded over to indicate the relation of the front side to the back side as the sheet rotates.

23. A computerized method comprising:
   displaying a user interface enabling a user to specify a print layout;
   visually representing the specified print layout on a front side and a back side of a sheet; and
   displaying, in the user interface, an animation of the sheet rotating from the front side to the back side of the sheet to show the visual representation of the specified print layout on both sides of the sheet.

* * * * *